Nov. 8, 1949     P. C. McLEMORE     2,487,353
FLAME CULTIVATOR

Filed April 30, 1945     7 Sheets-Sheet 1

INVENTOR.
Price C. McLemore
By Brown, Jackson,
Boettcher & Dienner
Attys.

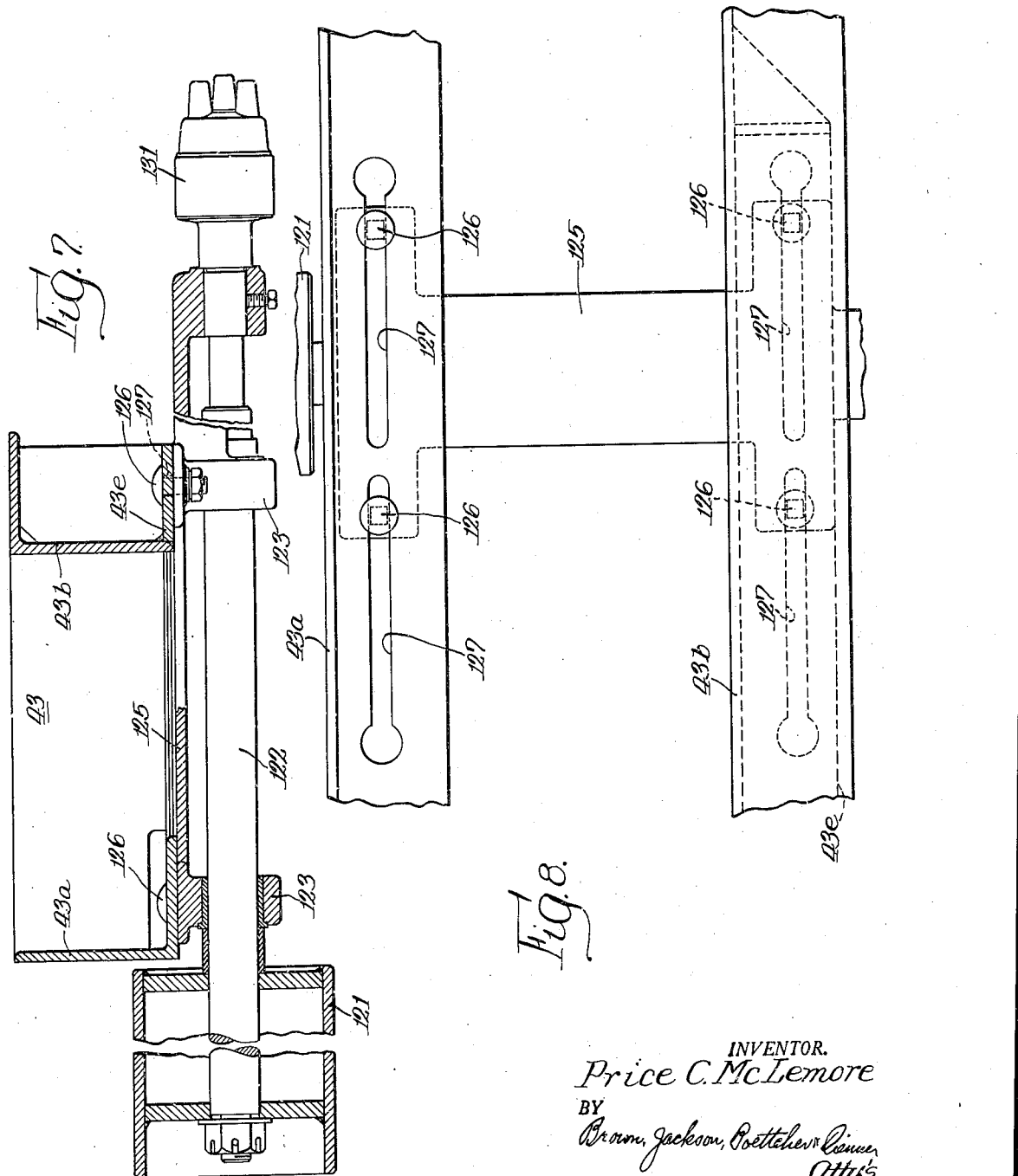

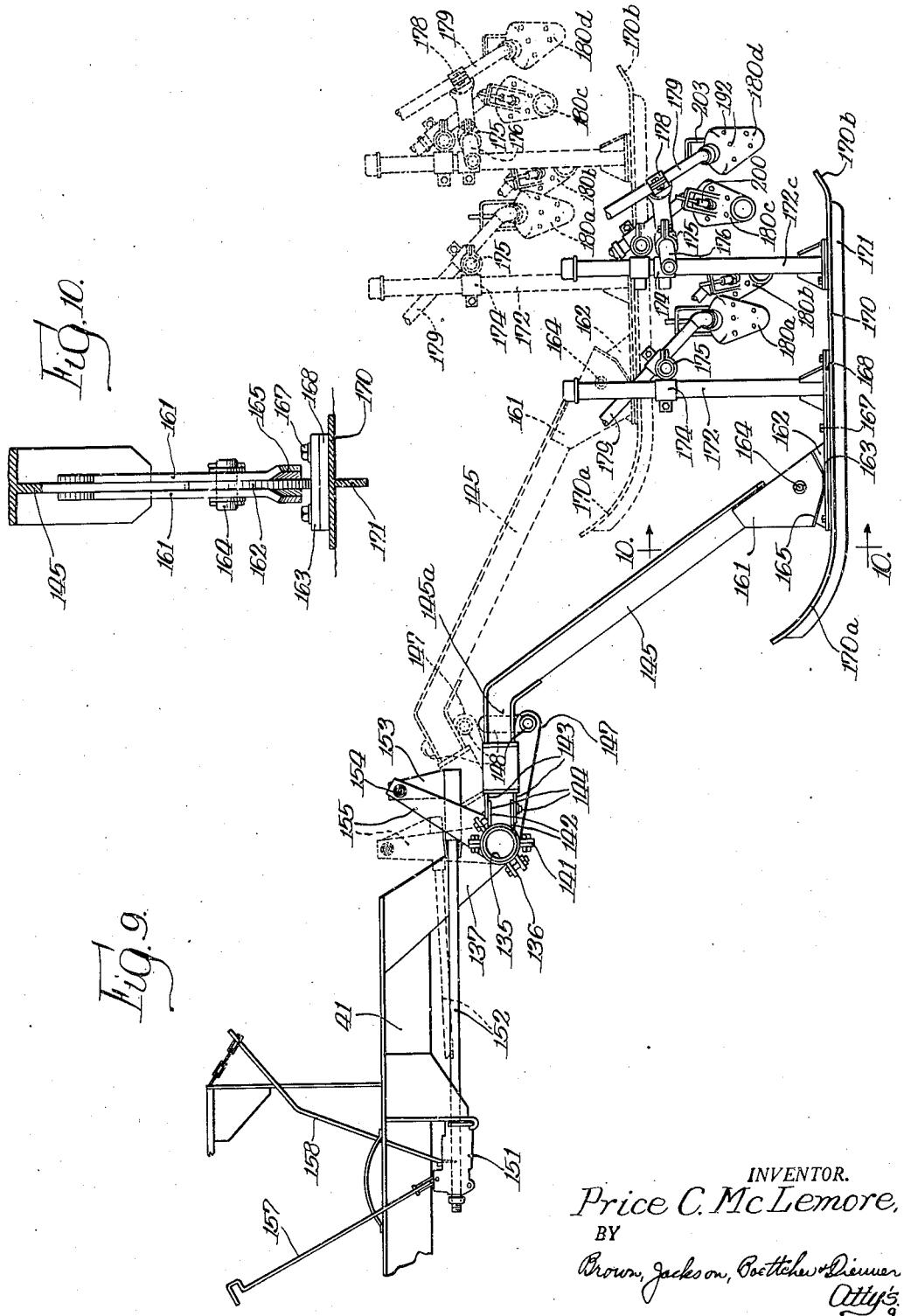

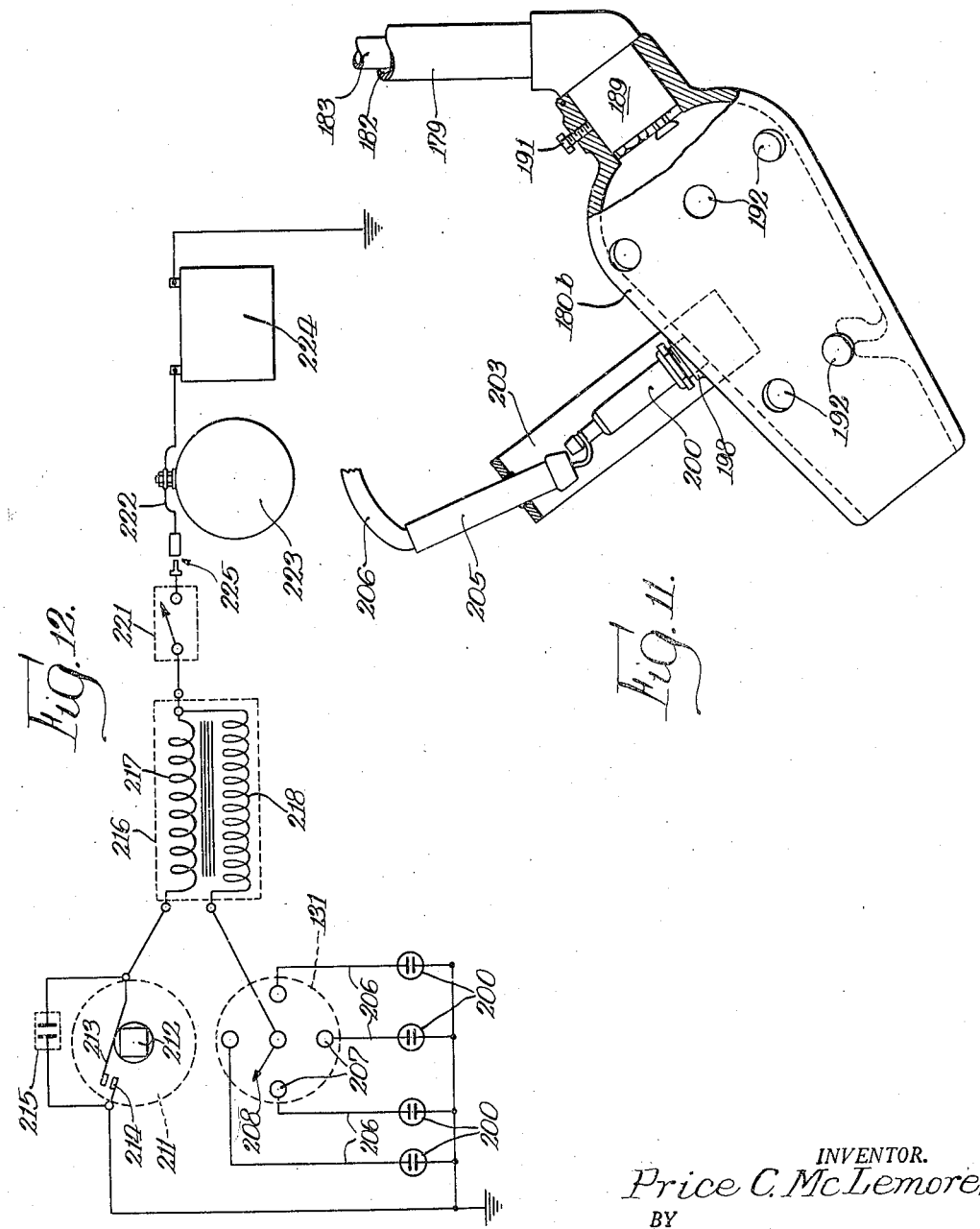

Patented Nov. 8, 1949

2,487,353

UNITED STATES PATENT OFFICE 2,487,353

FLAME CULTIVATOR

Price C. McLemore, Montgomery, Ala.

Application April 30, 1945, Serial No. 591,117

22 Claims. (Cl. 47—1)

The present invention relates to flame cultivators of the general type disclosed in my prior Patents No. 2,327,204, Reissue 22,803, and No. 2,408,328, and in the prior patent of myself and Valdemar Knudsen No. 2,391,027.

The flame cultivator disclosed in the present application is primarily intended for mounting on a farm tractor, and one of the principal objects of the present invention is to facilitate and simplify the mounting of the flame cultivator on the tractor when the farmer wishes to flame cultivate some crops, and similarly to facilitate and simplify the dismounting of the flame cultivator from the tractor when the farmer wishes to employ the tractor for other purposes. To this end, I have devised an improved attachment combination in which substantially all of the flame cultivator parts are combined in a unit assembly that can be mounted on the tractor and dismounted therefrom as a single unit. This unit assembly comprises an improved attachment frame on which are mounted: (1) all of the flame cultivator rigs, (2) the fuel tank for supplying fuel to the burners, (3) the power driven compressor for supplying compressed air to the burners, and (4) the fuel header, compressed air header, etc. All of these parts become a unit assembly to facilitate mounting the flame cultivator on the tractor and dismounting it therefrom. The improved attachment frame is preferably of U-shaped outline comprising two forwardly extending side arm portions and a transverse rear portion. The side arm portions are adapted to extend up along the sides of the tractor, and provision is made for ready attachment of the forward ends of these side arm portions to the sides of the tractor. Adjacent the rear portion of this attachment frame there are provided mounting members adapted for quick detachable mounting or improved axle seats or pads which are assembled over the rear axle housing portions of the tractor frame from which the rear wheel axles extend. This disposes the major weight bearing portion of the attachment frame in line with or over the rear wheels. For even distribution of weight, the fuel tank is preferably disposed on one side of the attachment frame and the power driven compressor on the other side. The flame cultivator rigs, the fuel header, and the compressed air header are preferably mounted on the transverse rear portion of the attachment frame. The form and construction of this attachment frame, together with interchangeable mounting and attachment devices of improved character, enable the attachment frame to be readily mounted on different makes and designs of tractors.

Another feature of the invention which facilitates the mounting of the flame cultivator on the tractor and the dismounting therefrom is an improved power transmitting drive from the power takeoff of the tractor to the compressor mounted on the attachment frame. This drive readily accommodates different locations of the power takeoff shaft on different makes of tractors, and the drive is also of such nature that it can be readily connected and disconnected in the mounting and dismounting of the flame cultivator.

Another feature of the invention resides in the provision of improved electrical ignition means for the burners. Each burner is provided with a spark plug, and the several spark plugs are energized by a sparking potential. The spark plugs serve to ignite the burners at the very start of the cultivating operation, and they also serve to automatically reignite any burner which accidentally becomes extinguished during the cultivating operation. There is always the possibility that the burners may be extinguished accidentally by clods of earth striking the open ends of the burners in the travel of the flame cultivator along the plant rows, or the burner flame may be extinguished by an extremely strong gust of wind, or by an air bubble in the fuel flow, or other accidental contingencies. The driver of the tractor may not know of this condition for a substantial interval, with the result that there may be a considerable length of unflamed area. The continuous and automatic reignition provided by the electrical spark plugs obviates this condition. Each spark plug might be arranged to fire constantly with a continuous sparking potential during the entire operating interval of the flame cultivator, but this would require a needless dissipation of electrical energy and would also result in a rapid burning of the sparking terminals of the plugs. Accordingly, I arrange to fire each spark plug at frequent regular intervals through the medium of a distributor which successively connects the spark plugs to a source of sparking potential.

Other objects, features and advantages of the invention will be apparent from the following detail description of one preferred embodiment thereof. In the accompanying drawings illustrating such embodiment:

Figures 7 and 8 are longitudinal sectional and plan views respectively showing the shiftable mounting of the idler pulley and its shaft;

Figure 9 is a fragmentary side elevational view of the burner rigs on a larger scale;

Figure 10 is a detail sectional view through one of the burner skids, corresponding to a section taken on the plane of the line 10—10 of Figure 9;

Figure 11 is a detail view of one of the burners; and

Figure 12 is a circuit diagram of the ignition system for the burners.

Figure 1:
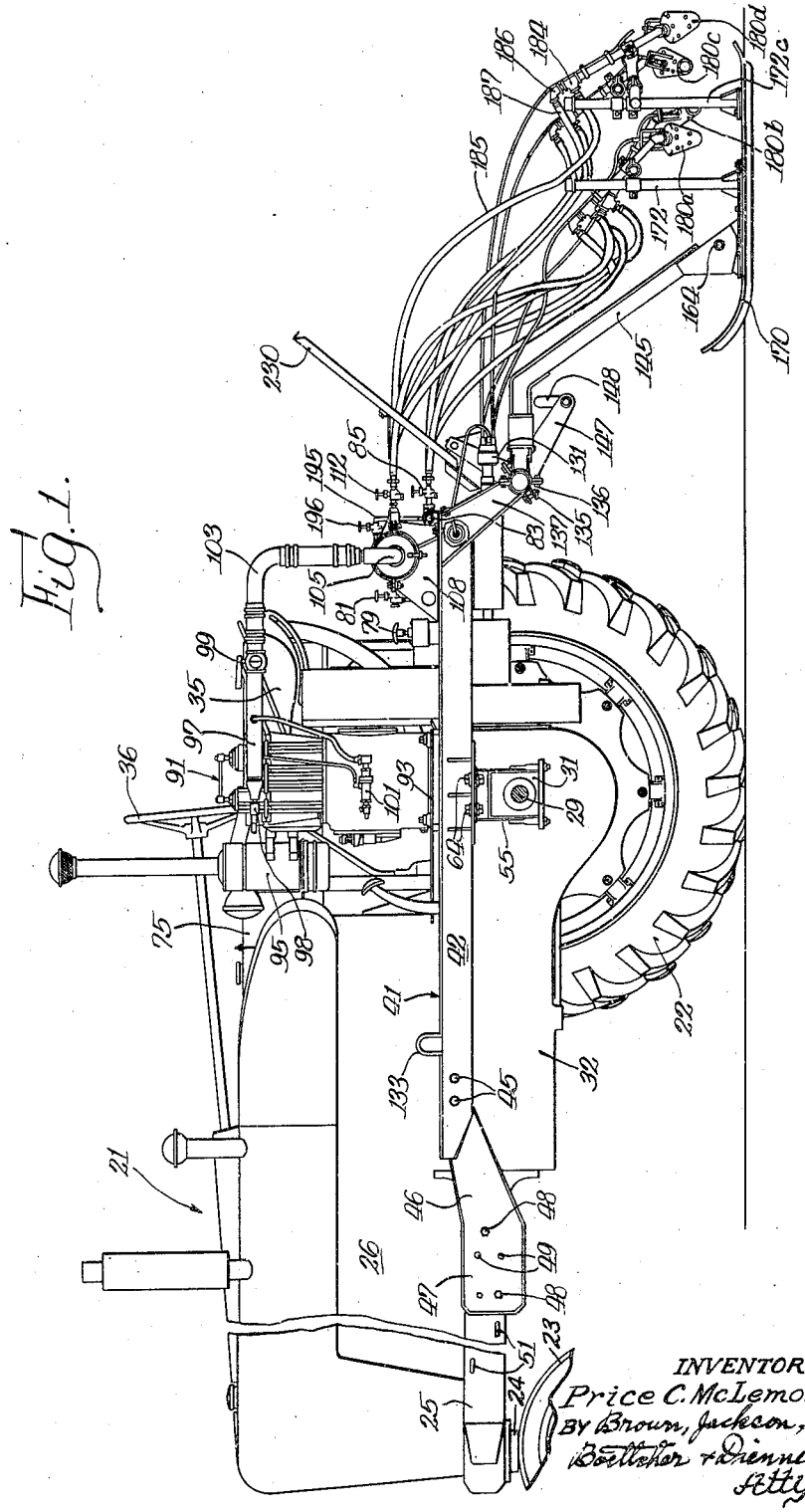
Figure 1 is a fragmentary side view showing my improved flame cultivator mounted on a conventional make of tractor, the adjacent rear wheel of this tractor being cut away in this view to show the attachment frame and cultivator parts to better advantage.

Referring first to Figure 1, a conventional tractor of well known make is indicated at 21, this tractor comprising rear driving wheels 22 and front steering wheels 23. The steering wheels 23 may be of the widely spaced type or of the narrowly spaced type as desired, the illustrated embodiment being of the narrowly spaced type with these two front wheels having steering motion around the axis of a vertical steering post 24 disposed centrally of the front end of the tractor. The tractor frame is indicated generally at 25, and the power plant at 26, the latter being provided with the conventional speed regulating governor. The power plant transmits a drive through a conventional selective speed transmission and thence through a differential mechanism to the axle shafts 29 extending outwardly to the rear wheels 22. These rear axles 29 project outwardly through axle housings 31 which extend laterally from the sides of a main housing 32 which encloses the selective speed transmission mechanism, clutch, differential mechanism, etc. Projecting from the rear end of the housing 32 is a power takeoff shaft 33 (Figure 2) from which I derive power for driving the air compressor of my flame cultivator, as will be presently described. The operator's seat on the tractor is indicated at 35, and the tractor steering wheel at 36, this driver's position having the conventional controls for the clutch, selective speed transmission mechanism, etc. All of the foregoing details of the tractor 21 are old and well known, being typical of the popular make of tractor illustrated in Figure 1. The rear driving wheels can be shifted outwardly to different degrees of row spacing along their respective axle shafts 29. In the case of a two-row flame cultivator such as is illustrated, these rear wheels 22 would be spaced to span two plant rows, in which case the flame cultivator assembly would employ three cultivator rigs comprising a central rig to travel between the two plant rows, and right and left rigs to travel along the outer sides of the plant rows.

Figure 3:
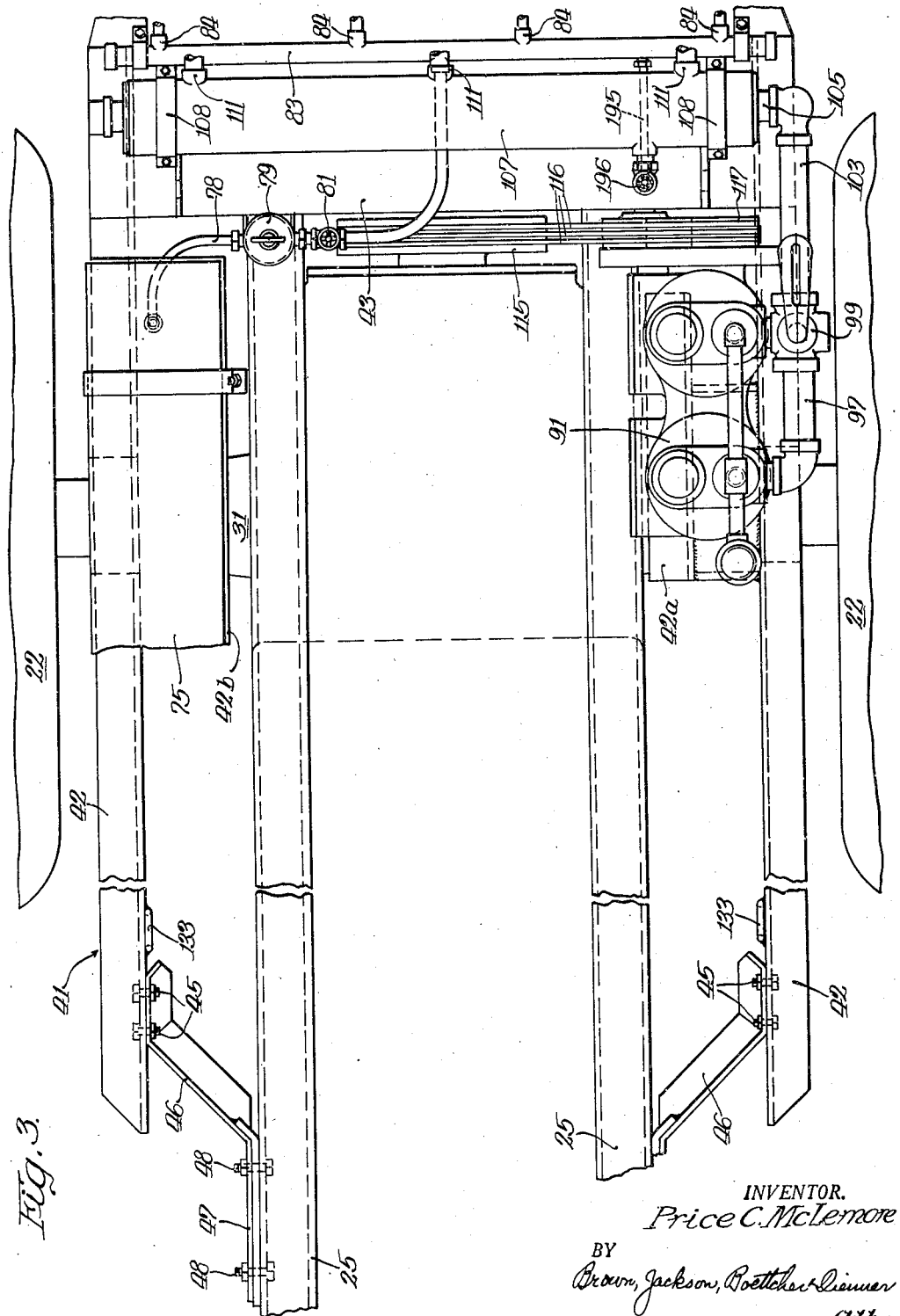
Figure 3 is a plan view, somewhat diagrammatic, showing the U-shaped outline of the attachment frame, and showing the mounting of the fuel tank at one side thereof and the mounting of the air compressor at the other side thereof.

Referring now to the attachment frame on which the flame cultivator parts are mounted, this frame is indicated in its entirety at 41 and is of U-shaped outline (Figure 3), comprising the two forwardly extending side arm portions 42, 42 and the transversely extending rear portion 43. Secured to the front ends of the side channels 42 by bolts 45 are inwardly converging attachment plates or brackets 46 which converge inwardly and then extend forwardly to form apertured bolting pads 47 for attachment by bolts 48 to the adjacent side frame bars of the tractor frame 25. A plurality of bolt holes 49 are provided in the bolting pads 47 for adapting the bolting attachment to different makes of tractors. The side frame bars of the tractor frame are also usually provided with several bolting slots or holes 51 therein to facilitate the bolting of different implement attachments to the tractor frame, and these bolting slots, where available, can also be utilized for securing the fastening brackets 46 to the tractor frame. Adapter plates may also be interposed between the bolting pads 47 and the tractor frame bars for adapting the attachment to different makes of tractors. In lieu of the bolting pads 47 and bolts 48, these forwardly extending side arms of the attachment frame might be connected with the tractor by a detachable chain or cable connected to the arms and extending under the power plant of the tractor.

Figure 4:
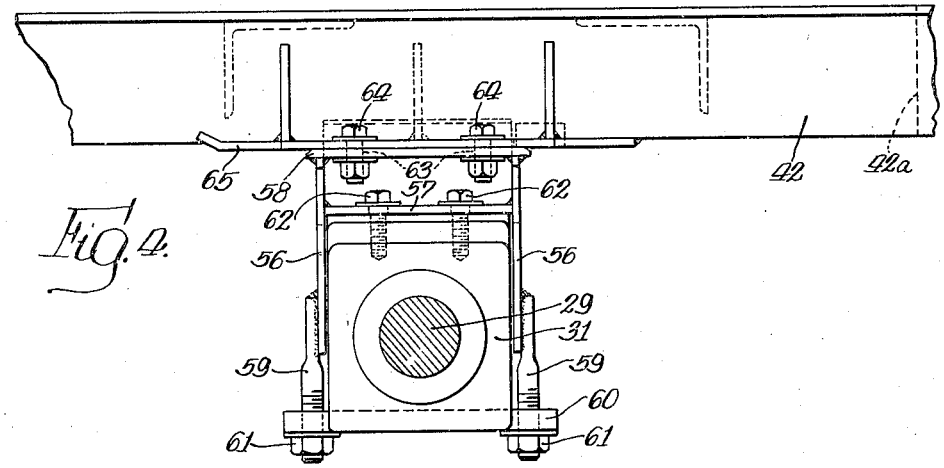
Figures 4, 5 and 6 are end, plan and side views respectively of one construction of mounting bracket for mounting the attachment frame on the axle housing portions of one make of tractor.
Figure 5:
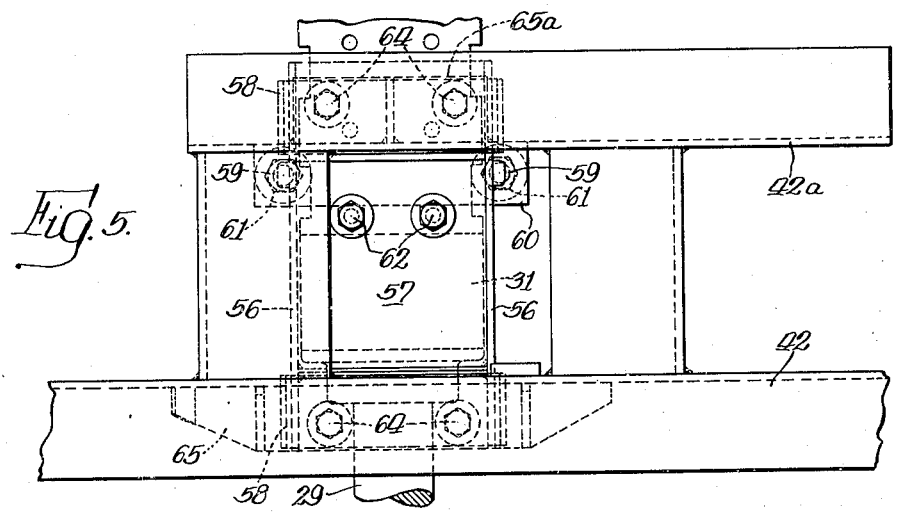
Figure 6:
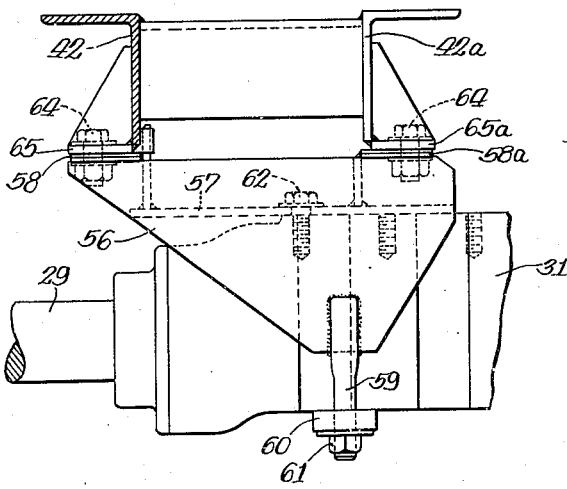

Referring now to the mounting of the attachment frame 41 on the axle housings 31, it will be seen from Figures 4, 5 and 6 that a convertible or replaceable axle seat or saddle mount 55 is disposed between each side bar 42 of the attachment frame and the associated axle housing 31. This axle seat or frame support pad 55 is shown as being constructed for a "Farmall" tractor, type H or M, such as is illustrated in Figure 1. In this construction, the seat or support is of box-like form comprising two vertical side plates 56, a top plate 57 and outer and inner seat plates or bars 58 and 58a, all welded together. The vertical side plates 56 drop down over the front and rear side surfaces of the axle housing 31, and the top plate 57 rests on top of said housing. Screw shanks 59 welded to the side plates 56 are adapted to pass down through an apertured yoke plate or bar 60 and to receive nuts 61 on their lower ends by which the box-like structure 55 and cross bar 60 can be drawn together in rigid clamping engagement over the axle housing 31. Screw 62 can be passed down through apertures in the plate 57 into tapped holes in the housing 31. The outer and inner seat plates 58 and 58a, welded to the top edges of the side plates 56, are provided with holes 63 for receiving outer and inner pairs of quick detachable fastening bolts 64, which are adapted to be released when the attachment frame 41 is to be separated from the tractor. The outer pair of fastening bolts 64 extends up through an outer mounting plate 65 welded to the frame bar 42, and the inner pair of fastening bolts extends up through an inner mounting plate 65a welded to the supplementary frame bar 42a. This supplementary frame bar 42a is a short bar welded to the main bar 42 through the medium of transverse spacers to form a platform for mounting the compressor 91. When detaching the flame cultivator from the tractor it is only necessary to release the bolts 64 to permit the mounting plates 65 and 65a to be separated from the seat plates 58 and 58a. Other forms of mounting brackets 55 are provided for other makes and types of tractors.

Referring now to the fuel supply tank and fuel supply connections, the tank is indicated in its entirety at 75, and is shown as being mounted along the right hand side of the attachment frame 41 (Figure 2), preferably above or somewhat forward of the rear wheel axles 29. This fuel tank is supported in any suitable cradle support secured to a platform structure similar to the platform structure just described for the compressor, i. e., it comprises a supplementary frame bar 42b situated just inside the adjacent frame bar 42, comparable to the supplementary bar 42a on the left hand side. The liquid fuel flows from the tank through supply line 78 to a filter 79 from whence it is then conducted to a master fuel valve 81. From here, the fuel line extends to a transverse fuel header 83 which consists of a section of pipe or tubing extending transversely across the rear end of the attachment frame and suitably secured on the transverse rear frame portion 43 by any suitable form of mounting brackets. Projecting rearwardly from the fuel header 83 at spaced points are outlet nipples or bosses 84, one for each of the fuel burners. Fuel strainer valves 85 receive the fuel through each of these outlet nipples, these fuel strainer valves being connected with their respective fuel burners through flexible hose lines, as I shall later describe.

Referring now to the compressed air supply for the burners, the power driven compressor is indicated in its entirety at 91, and is mounted on the left hand frame bar 42 of the attachment frame, preferably approximately above or near the rear axle shaft 29. This compressor may be of any conventional construction, the one illustrated being a two cylinder unit having a capacity of approximately 40 to 50 cubic feet per minute at approximately 50 pounds per square inch pressure. The compressor is bolted to the bar 42 and to the inner bar 42a which projects laterally from the adjacent side bar 42 of the attachment frame. It will be noted that this compressor balances, more or less, the weight of the loaded fuel tank 75 on the opposite side of the attachment frame, so that the weight of these relatively heavy units of the flame cultivator attachment is distributed between the two sides of the attachment frame and tractor. The air entering the compressor is first passed through a suitable air cleaner 95 which connects with the intake manifold leading to the two cylinders of the compressor. At the outlet side, the discharge manifold 97 is provided at its front end with a pop-off valve 98, and the rear end of the manifold is provided with a master air valve 99. In addition, the compressor is also preferably provided with a self-unloader valve 101 of known construction. The master air valve 99 can discharge the compressed air through an outlet nipple to atmosphere, or it can direct the compressed air through conduit 103 which connects with inlet pipe 105 extending into one end of the air supply header 107. This header 107 extends transversely of the rear end of the attachment frame, being mounted on suitable attachment brackets 108 bolted or otherwise secured to the rear portion of the attachment frame. In some instances it may be desirable to have the inlet pipe 105 extend the entire length of the header 107 and function as a pressure equalizing distributor for the header, this function being obtained by providing the pipe 105 with air discharge slots or openings therein of different effective areas at different points along the length of the pipe, whereby all points along the inside of the header 107 will be maintained at substantially the same effective pressure. Discharge nipples or bosses 111 project rearwardly from the header 107 for establishing connection with air strainer valves 112 which connect through flexible hoses with the burner heads, as I shall presently describe.

Figure 2:
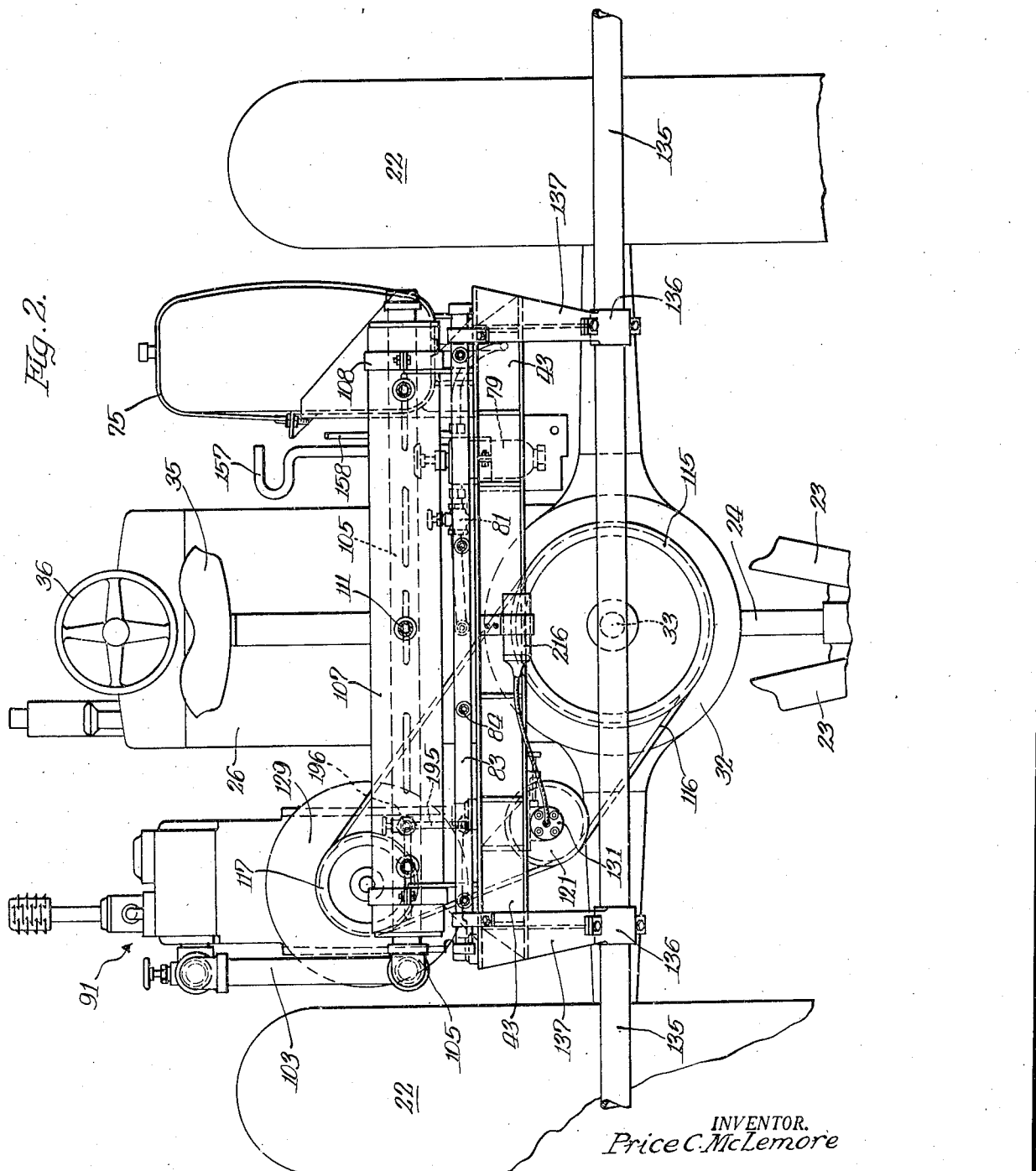
Figure 2 is a fragmentary rear view, somewhat diagrammatic, showing the rear portion of the attachment frame, the fuel tank, compressor and fuel and air headers, this view corresponding approximately to a section through Figure 1 on a plane in rear of these headers.

Referring now to the power transmitting drive leading from the power takeoff shaft 33 of the tractor to the compressor 91, it will be seen from Figure 2 that the power takeoff shaft 33 is provided with a belt pulley 115 for transmitting power through a belt drive 116 to a belt pulley 117 mounted on the rear end of the compressor shaft. This belt drive is preferably of the multiple V-belt type, in the illustrated construction three of these V-belts being employed, and the two belt pulleys 115 and 117 having a corresponding number of peripheral grooves for receiving these three V-belts 116. The belt pulley 115 which is mounted on the power takeoff shaft 33 is preferably of the quickly demountable type comprising a split central hub which is clamped and keyed to the power takeoff shaft, and to which split hub the solid web portion of the multiple groove V-belt pulley 115 is bolted. By virtue of this construction, the belt pulley 115 can be quickly removed from the power takeoff shaft 33 if it is desired to apply some other type of driving attachment to the power takeoff shaft after removing the flame cultivator from the tractor.

The V-belts 116 preferably have a substantial amount of slack which is adapted to be taken up by an idler pulley 121 over which the belts pass. This provision of slack in the driving belts, to be taken up by an idler pulley, serves the twofold purpose of enabling the V-belts to be released more freely from their pulleys when detaching the flame cultivator from the tractor, and also of adapting the air compressor drive to different makes of tractors in which the power takeoff shaft 33 may be situated at higher or lower points with respect to the horizontal plane of the compressor crank shaft. The idler pulley 121 is mounted on a shaft 122 which is journaled in spaced bearings 123 formed integral with or secured to a shift plate 125 (see Figures 7 and 8). This shift plate is bolted to the under side of the transverse rear frame structure 43 by clamping bolts 126 which pass up through long transverse slots 127 provided in the bars 43a and 43c of the frame structure 43. By loosening these clamping bolts 126 and shifting them sidewise in the slots 127 the entire assembly of shift plate 125, shaft 122 and idler pulley 121 can be shifted horizontally either to the left or right for putting slack into the V-belts 116 or taking slack out of these belts. In adapting the flame cultivator to other makes of tractors in which the power takeoff shaft 33 is at a higher or lower point than that indicated in Figure 2, the V-belts 116 are taken up or paid out to accommodate higher or lower locations of the power takeoff shaft, this being accomplished by merely loosening the clamping bolts 126 and shifting the mounting plate 125 transversely to dispose the idler pulley 121 at the appropriate point corresponding to this higher or lower location of the power takeoff shaft. Similarly, when the farmer desires to disconnect the flame cultivator from the tractor he disconnects the air compressor drive by merely loosening the clamping bolts 126 and shifting the mounting plate 125 to the right a sufficient distance to place substantial slack in the V-belts 116, thereby facilitating the operation of stripping these belts out of the grooves of the belt pulley 115 on the power takeoff shaft. If desired, suitable guards may be provided to enclose the belt pulleys and belt drive to prevent the possibility of anything becoming caught in the belt drive. The belt pulley 117 on the compressor crank shaft preferably has a fan associated therewith for blowing air up and across the cylinders of the compressor for cooling the cylinders, this fan being indicated at 129 in Figure 2.

The idler pulley shaft 122 also serves to drive the distributor which distributes the sparking potential to the different spark plugs of the different burner heads. This distributor is indicated at 131 in Figures 1 and 2, the rotary element of the distributor being connected directly to the idler pulley shaft 123 so as to rotate therewith at all times. The electrical connections of this ignition distributor 131 will be later described in connection with the burner rigs.

From the description thus far, it will be seen that my improved construction affords a unit assembly of flame cultivator parts all mounted on the attachment frame 41, these parts including the fuel tank 75, the fuel header 83, the air compressor 91, and the air header 107. When the farmer desires to remove the flame cultivator from the tractor he releases the front attachment bolts 45 and also releases the rear attachment bolts 64 from the axle housing brackets 55, and disconnects the belt drive 116. This is the preferred procedure, although the disconnection can be made at the front bolts 46 and rear bolts 59, 61, if desired. Thereupon, the entire unit assembly of attachment frame 41, together with fuel tank and compressor and headers, can be lifted vertically from the tractor, and the tractor driven out from under this unit assembly. The front portions of the frame side bars 42 are preferably provided with U-bolts or eye-bolts 133 to which a block and tackle or other hoisting rig can be readily connected. Such a hoisting rig can also be connected to the rear portion of the attachment frame 41, preferably around or adjacent to the transverse rear draft bar 135. Thus, the entire unit assembly can be lifted entirely free of the tractor and the tractor then driven out from under the assembly. Conversely, in mounting the flame cultivator back on the tractor, the latter can be backed in under the unit assembly and the latter lowered into place down upon the tractor for attachment thereto by a reversal of the steps pointed out above.

Referring now to the burner rigs, each of these rigs has draft attachment to a transverse rock tube 135 which serves the combined functions of a draft tube and also of a lifting tube for rocking the burner rigs up to their elevated positions, clear of the ground, when turning the implement at the ends of the field or when traveling to and from the field. This transverse rock tube 135 is rotatably supported in bearings 136 mounted at the lower ends of diagonal bracket arms 137 extending outwardly and downwardly from the rear end of the attachment frame 41. Each burner skid rig has draft attachment to the draft tube 135 through the medium of a split draft coupling 141 which is always free to swivel or rotate freely on the draft tube 135 in order to permit free rising and falling movement of the burner rig. A pair of vertically spaced ears or lugs 142 project rearwardly from each draft coupling 141, and extending forwardly from the burner rig is a similar pair of lugs or ears 143 which embrace the ears or lugs 142. The two sets of ears or lugs are pivotally connected together by the pivot bolts or pivot pins 144 which establish a substantially vertical pivotal axis around which the burner rig can swing freely to right or left. The combination of the couplings 141 and the associated sets of interconnected lugs or ears 142 and 143, provide articulated joints between the draft bar 135 and the draft arms 145. Each burner rig is pulled and guided through an upwardly inclined draft arm 145 having a horizontally bent front end portion 145a. The swivel lugs 143 are secured to the front end of this horizontally bent portion 145a. The lifting of all of the rigs to the inoperative positions illustrated in dotted lines in Figure 9 is effected by a rocking movement of the draft and lifting tube 135. Lifter arms 147 are welded to the tube 135 at spaced points across the length of the tube, and the lower ends of these lifter arms are provided with holes in which is welded a tubular lifter bar 148 extending transversely across the entire width of the rig assembly. When the tube 135 is rocked in a counter-clockwise direction, the lifter arms 147 carry the lifter bar 148 upwardly into engagement with the lower edges of the horizontally bent upper ends 145a of the draft arms 145. Thus, all of the burner rigs can be swung up substantially simultaneously to the inoperative position illustrated in dotted lines by such rocking motion of the tube 135. When the lifter arms 147 and lifter rod 148 have been restored to their lower positions the burner rigs are in direct contact with the ground and are free to rise and fall to a considerable latitude without having the bent portions 145a strike against the lifting rod 148. Those portions of the lifting rod 148 which are in fore and aft alignment with the plant rows are preferably humped or bent upwardly to provide increased clearance for clearing the plants in the plant row.

Rocking motion is transmitted to the tube 135 for lifting the rigs through the instrumentality of a jack or like lifting device 151 which is disposed in a position convenient of access to the driver when seated in the tractor seat 35. This jack device 151 is operative to exert a forward pulling force on a rod 152 which has a rigid right angle arm 153 secured to its rear end. The upper end of the arm 153 is pivotally connected by a pivot bolt 154 with an actuating arm 155 which has its lower end welded to the rock tube 135. Thus, it will be seen that forward pulling motion through rod 152 is operative to rock the tube 135 in a counterclockwise direction for swinging the burner rigs up to their inoperative positions, the right angle arm 153 being provided merely for the purpose of clearing the rear end portion of the attachment frame 41. The actuating or jack unit 151 can be of any preferred or conventional type, either in the form of a friction jack or a hydraulic jack or any other preferred construction. In the arrangement illustrated I have shown a well known form of friction jack in which oscillatory stroking movements of the actuating lever 157 are operative through a frictional clutch device to impart forward step by step movement to the rod 152. The rod 152 is frictionally locked in each advanced position by the action of a friction detent collar, which detent collar is adapted to be released through the operation of a releasing lever 158. Releasing motion of the lever 158 frees the rod 152 of the detent action of the friction detent ring and allows the rod 152 to move backwardly so that the burner rigs can return to their normal positions in contact with the ground.

Referring now in detail to the construction of these rigs, it will be seen from Figure 10 that each draft arm 145 is of T-shaped cross section, and has a pair of spaced plates 161 welded to the web portion of the T on each side thereof. These plates 161 embrace a pivot ear 162 which extends upwardly from an attachment plate 163 fastened to the burner skid. A pivot pin 164 passes through the plates 161 and pivot ear 162 for establishing a horizontal pivot axis around which the burner skid can swing relatively to the draft arm 145. The lower edge of each plate 161 is cut with a sloping shoulder 165 extending upwardly and forwardly from a point approximately below the pin 164. These inclined edges 165 form stop surfaces against which the top surface of the attachment plate 163 is adapted to abut when the rig is swung upwardly to its inoperative position, as shown in dotted lines. With the attachment plate 163 abutting these stop surfaces 165, the skid is held in a more or less horizontal position, thereby avoiding the rear end of the skids dragging along the ground or striking obstructions on the ground.

The attachment plate 163 is fastened by cap screws 167 to a mounting plate 168 which is welded to the top side of the skid 170. The skid 170 is preferably constructed of a flat plate having a pronounced upward curvature 170a at its front end, and an upwardly deflected rear end 170b, this rear end preventing the skid from digging into the ground in the event that the rigs should be backed a short distance. A downwardly extending fin or runner 171 is welded to the under side of the plate 170 to extend longitudinally of the plate in the median line thereof, this fin assisting in causing the runner to track in a straight direction, and to minimize side slipping on slopes.

The right and left, or outer rigs, each have a tubular standard 172 rising vertically therefrom at a point approximately mid-way back of the length of the runners, and the central rig has a like tubular standard 172c which preferably rises from its skid or runner at a point closer to the rear end of the skid. Mounted on all three tubular standards 172, 172 and 172c are adjustable clamps 174 having split sections which can be frictionally gripped to the tubular standards, this friction clamp portion 174 being adjustable vertically along the standard and also being adjustable rotatively around the axis of the standard. Each adjustable clamp portion 174 also carries a split adjustable clamp portion 175 through which extends an approximately horizontal tubular arm 176. This tubular arm can be slid lengthwise back and forth through the clamp section 175 and can also be rotated angularly within said clamp section to effect adjustments of the burner. The tightening of the clamp section locks the tubular arm 176 in any of these adjusted positions. Mounted at one end of the tubular arm 176 is another friction clamp 178 through which passes the fuel and air standard 179 which carries the burner. I have indicated the burner of the left hand rig at 180a, the burner of the right hand rig at 180b, and the two outwardly facing burners of the central rig at 180c and 180d. Each of these burners is mounted at the lower end of a combination fuel and air standard 179 which is frictionally clamped within an adjustable friction clamp 178. The standard 179 can be slid lengthwise upwardly or downwardly within the friction clamp 178, and can also be rotated therein. In addition, the friction clamp 178 can be swiveled relatively to the tubular arm 176 about an axis extending approximately at right angles to the axis of the fuel and air standard 179. Thus, by virtue of these several adjustments, the burners can be adjusted to different heights relatively to the ground, to different angles relatively to the ground, to different distances laterally toward and away from the plant rows, to different fore and aft angles, and to different degrees of fore and aft offset so that the flames from opposing burners do not impinge against each other. Somewhat similar adjustments of the burners are shown in Reissue Patent No. 22,836 of myself and Valdemar Knudsen.

Referring to Figure 11, each fuel and air standard 179 is formed with a concentric assembly of outer air pipe 182 and inner fuel pipe 183. The upper end of each air pipe 182 has a suitable T-connection 184 (Figure 1) with a flexible hose 185 which extends to a corresponding air strainer valve 112. The upper end of each inner fuel pipe 183 has a suitable elbow-connection 186 (Figure 1) with a flexible tube 187 leading up to a corresponding fuel strainer valve 85. The primary purpose of the valves 85 and 112 is to establish the proper proportions of fuel and air for securing the desired flame at each of the burners. Once that the proper mixture is secured these valves 85 and 112 are not disturbed. The flow of fuel is stopped for all of the burners through the closing of the master fuel valve 81, and the flow of air is stopped for all of the burners through the closing of the master air valve 99.

Referring again to Figure 11, the air and fuel pipes 182 and 183 terminate in an inclined nozzle structure 189 to which the burner shell is secured by a set screw 191. This burner shell is provided with a plurality of apertures 192 for permitting an induction flow of atmospheric air.

The fuel and air systems of the cultivator include a unique valve-controlled by-pass 195, as best illustrated in Figures 1 and 2. This by-pass is in the form of a duct extending from the air supply header 107 to the fuel supply header 83. Interposed in this by-pass is a control valve 196. The purpose of this by-pass is to transmit a blast of compressed air through the fuel supply header and all of the fuel connections leading to the burners at the end of the day's operation, so as to scavenge or blow out all of the oil remaining in the oil connections leading from the header 83 down to the burner nozzles 189. This is accomplished by first closing the master fuel valve 81 and then opening the by-pass valve 196 so as to transmit compressed air directly to the fuel header 83, so that this compressed air will pass through the header and through the several hose lines conducting fuel down to the burner nozzles. Thus, all accumulations of fuel are blown out of these supply connections, so that they do not remain in the hose members, pipes, etc., to cause deposits therein.

Referring now to the electrical ignition system for the burners, attention is particularly directed to Figures 11 and 12, from which it will be seen that each burner shell is provided with a threaded boss 198 through which screws the threaded lower end of a spark plug 200. This disposes the spark gap terminals within the burner shell in immediate proximity to the jet of fuel and air. A U- shaped protecting strap 203 extends in inverted relation over the spark plug, with its ends welded to the burner shell, this strap thereby serving as a protective guard to prevent vegetation, dirt, or other obstructions from striking the spark plug 200. The upper portion of the protecting strap has an insulator bushing 205 passing therethrough, and an electrical conductor 206 extends down through this bushing for making connection with the insulated electrode of the spark plug. The four conductors 206 leading from the four burners all extend to the distributor 131, which is driven by the idler pulley shaft 122, which latter arrangement has been previously described. This distributor is diagrammatically indicated in Figure 12, from which it will be seen that it comprises the conventional arrangement of four circularly arranged stationary contacts 207 with which a rotating contact 208 is adapted to make successive engagement. The distributor also includes a make and break vibrator or circuit interrupter diagrammatically indicated at 211. This make and break contactor comprises a rotating polygonal cam or wiper member 212 which is also driven by the idler pulley shaft 122 and which is adapted to swing a movable contact 213 into and out of engagement with a stationary contact 214. These contacts are bridged by the conventional condenser 215. Sparking potential is generated within a conventional ignition coil 216 which has its primary 217 connected in series through the contacts 213 and 214 with ground. The secondary 218 of the ignition coil is connected to the rotating contact 208 of the distributor. The other ends of the windings 217 and 218 are connected to an ignition switch 221 which has electrical connection with current supply wire 222 leading to the generator 223 and storage battery 224 of the tractor. A quick detachable electrical connection 225 is interposed between the switch 221 and the current supply wire 222 so as to facilitate the ready disconnection of the burner ignition system from the electrical system of the tractor when the flame cultivator is detached from the tractor. By virtue of the distributor 131 and make and break contactor 211, a sparking potential is automatically transmitted at predetermined intervals to each of the burner spark plugs, the frequency of the sparking impulses being sufficient to cause relatively prompt ignition of the burner if it should become accidentally extinguished, but preventing or reducing the burning of the spark plug points and deterioration of the ignition system such as would be more likely to occur if a spark was continuously maintained at each of the spark plugs 200.

Referring to Figure 1, a heat shield 230 has its lower edge secured to the attachment frame 41 and is positioned to slope upwardly and rearwardly from a point in rear of the metering valves 85 and 112, where it will afford substantial protection to the operator from the heat of the burners while still leaving these valves readily accessible. The operator can view the burners over the top of this heat shield any time that he desires. The hoses 185 and 187 pass through holes in the shield.

While I have illustrated and described what I regard to be the preferred embodiment of my invention, nevertheless it will be understood that such is merely exemplary and that various modifications and rearrangements may be made therein without departing from the essence of the invention.

I claim:

1. A flame cultivator attachment adapted to be connected to a tractor comprising a frame having side arm portions and a transverse rear portion, said frame being adapted to be assembled with the tractor with said side arm portions fastened to the sides of the tractor, a plurality of burners of the blast type coupled to said frame, a fuel tank mounted on said frame for supplying fuel to said burners, and a power driven compressor mounted on said frame for supplying compressed air to said burners, said fuel tank and said compressor being removed with said frame as a unit assembly in the detachment of said frame from the tractor.

2. A flame cultivator attachment adapted to be connected to a tractor comprising a frame having side arm portions and a transverse rear portion, said frame being adapted to be assembled with the tractor with the side arm portions extending along the sides of the tractor, a plurality of burners coupled to said frame, and a fuel tank mounted on said frame for supplying fuel to said burners, said fuel tank being removed with said frame as a unit in the detachment of said frame from the tractor.

3. A flame cultivator attachment adapted to be connected to a tractor comprising a frame having side arm portions and a transverse rear portion, said frame being adapted to be assembled with the tractor with the side arm portions extending along the sides of the tractor, a plurality of burners of the blast type coupled to said frame, and a power driven compressor mounted on said frame for supplying compressed air to said burners, said compressor being removed with said frame as a unit in the detachment of said frame from the tractor.

4. A flame cultivator attachment adapted to be connected to a tractor having a power takeoff comprising a U-shaped frame having side arm portions and a transverse rear portion, said frame being adapted to be assembled with the tractor with the side arm portions fastened to the sides of the tractor, a plurality of burners of the blast type coupled to said frame, a fuel tank mounted on said frame for supplying fuel to said burners, a compressor mounted on said frame for supplying compressed air to said burners, and quick detachable drive means adapted to connect said power takeoff in driving relationship with said compressor, said fuel tank and compressor being removed with said frame as a unit in the detachment of said frame from the tractor.

5. A flame cultivator attachment for a tractor having front and rear wheels, axle housing portions for said rear wheels, and a power takeoff comprising a frame having side arm portions and a transverse rear portion, said frame being adapted to be assembled with the tractor with the side arm portions extending along the sides of the tractor, means for fastening the front ends of said side arm portions to the sides of the tractor, saddle mounts secured to said arm portions for connecting said side arm portions with the rear axle housing portions of the tractor, a plurality of burners of the blast type coupled to the transverse rear portion of said frame, a fuel tank mounted on one of the side arm portions of said frame for supplying fuel to said burners, a compressor mounted on the other side arm portion of said frame for supplying compressed air to said burners, and quick detachable drive means adapted to connect said compressor in driving relationship with the power takeoff of the tractor, said fuel tank and compressor being removed with said frame as a unit in the detachment of said frame from the tractor.

6. A flame cultivator attachment adapted to be connected to a tractor having rear axles and axle housings therefor comprising frame supporting fixtures adapted to be secured to said axle housings, a frame adapted to be mounted on the tractor and including means to engage with said frame supporting fixtures, a plurality of burners coupled to said frame, a fuel tank carried by said frame for supplying fuel to said burners, and a compressor carried by said frame for supplying compressed air to said burners.

7. A flame cultivator attachment adapted to be connected to a tractor having a housing enclosing the transmission, differential and rear axles comprising frame supporting brackets adapted to be secured to said housing on opposite sides thereof, attachment members adapted to be secured to the forward portion of said tractor, a frame comprising side arm portions and a transverse rear portion, means for mounting said side arm portions on said frame supporting brackets and interfitting therebetween, means for attaching the front ends of said side arm portions to said attachment members and disposed therebetween, a plurality of burners coupled to the rear portion of said frame, a fuel tank mounted on said frame for supplying fuel to said burners, and a compressor mounted on said frame for supplying compressed air to said burners.

8. A flame cultivator attachment adapted to be connected to a tractor comprising a frame having side arm portions and a transverse rear portion, said frame being adapted to be assembled with the tractor with the side arm portions extending along the sides of the tractor, a plurality of burners of the blast type coupled to the rear portion of said frame, a fuel supply header extending transversely across the rear portion of said frame and coupled with said burners to supply fuel thereto, an air supply header extending transversely across the rear portion of said frame and coupled with said burners to supply compressed air thereto, a fuel supply tank carried by said frame supplying fuel to said fuel supply header, and a compressor carried by said frame for supplying compressed air to said air supply header.

9. A flame cultivator attachment adapted to be connected to a tractor having a power takeoff comprising a frame, a plurality of burners of the blast type coupled to said frame, a fuel tank mounted on said frame for supplying fuel to said burners, a compressor mounted on said frame for supplying compressed air to said burners, belt drive means for transmitting power from said power takeoff to said compressor and adapted to be interconnected in driving relationship therebetween, and an idler pulley adjustably mounted on said frame for adjusting the slack in said belt drive means.

10. A flame cultivator attachment adapted to be connected to a tractor having a power takeoff comprising a frame, a plurality of burners coupled to said frame, means carried by said frame for supplying fuel to said burners, a compressor mounted on said frame for supplying compressed air to said burners, a driving pulley adapted to be carried by said power takeoff, a driven pulley carried by said compressor, belt means for transmitting power from said driving pulley to said driven pulley, an idler pulley adapted to engage against said belt means, a shaft for said idler pulley, a shiftable bearing plate for said idler pulley shaft, and means for adjustably securing said shiftable bearing plate in different shifted positions on said frame, whereby to adapt the belt drive to different tractors having their power takeoff shafts in different locations, and whereby to place substantial slack in said belt drive means for enabling the latter to be removed from one or both of said pulley wheels when the frame is to be removed from the tractor.

11. A flame cultivator attachment for a vehicle adapted to travel along the plant rows comprising a transversely extending draft bar adapted to be carried by said vehicle, a plurality of burner rigs, a plurality of skids separately supporting said burner rigs and pivotally connected with said draft bar so as to be individually capable of rising and falling movement relatively thereto, means interconnected with said draft bar for transmitting rocking movement thereto, and lifter means actuated by such rocking movement for lifting said skids and burner rigs to inoperative positions.

12. A flame cultivator attachment for a wheeled vehicle adapted to travel along the plant rows comprising a transversely extending draft bar adapted to be mounted on the rear portion of said vehicle, a plurality of skid-mounted burner rigs pivotally connected with said draft bar so as to be capable of rising and falling movement relatively to said draft bar in traveling over uneven ground, manually actuated jack means interconnected with said draft bar for transmitting rocking movement thereto, lifter arms extending from said draft bar, and a lifter bar carried by said lifter arms operative upon such rocking movement of said draft bar to lift said burner rigs upwardly to inoperative positions out of engagement with the ground.

13. A flame cultivator attachment adapted to be connected to a vehicle adapted to travel along the plant rows comprising a plurality of burner rigs each comprising a skid adapted to slide along the ground and burners carried by said skids, draft connections extending from said skids for interconnecting said skids and said vehicle including means permitting said skids to rise and fall vertically independently of each other and to move laterally relatively to each other, and lifting means for lifting said skids and burner rigs to inoperative positions out of contact with the ground.

14. A flame cultivator attachment adapted to be connected to a vehicle adapted to travel along the plant rows comprising a transversely extending draft member adapted to be carried by said vehicle, a plurality of burner rigs each comprising a skid adapted to slide along the ground, burners carried by said skids, a draft arm extending from each of said skids and having draft connection with said transverse draft member, means associated with said draft arms enabling said skids to rise and fall vertically relatively to each other in passing over uneven ground, and an articulated joint in each of said draft arms permitting said skids to swing sidewise relatively to said vehicle and relatively to each other in traveling along the ground.

15. A flame cultivator attachment adapted to be connected to a vehicle adapted to travel along the plant rows comprising a transversely extending draft bar adapted to be carried by said vehicle adjacent the rear end thereof, a plurality of burner rigs, each comprising a skid adapted to slide along the ground, burners carried by said skids, a draft arm extending from each skid and pivotally connecting with said draft bar through independently acting pivotal connections for free rising and falling movement of said skids relative to each other in passing over uneven ground, an articulated joint associated with each draft arm permitting said skids to swing sidewise relatively to the vehicle and to each other in traveling over the ground, and lifting means adapted to apply lifting force to said draft arms at points in rear of said articulated joint when it is desired to swing said burner rigs upwardly to inoperative positions out of contact with the ground.

16. A flame cultivator attachment adapted to be connected to a vehicle adapted to travel along the plant rows comprising a transversely extending draft bar adapted to be carried by said vehicle, a plurality of burner rigs each comprising a skid adapted to slide along the ground, a draft arm extending from each skid to said draft bar, means pivotally connecting the front end of each draft arm with said draft bar for swinging movement around a substantially horizontal axis, and means pivotally connecting the rear end of each draft arm with its respective skid for pivotal movement therebetween on a substantially horizontal pivot axis.

17. A flame cultivator attachment adapted to be connected to a vehicle adapted to travel along the plant rows comprising a transversely extending draft bar adapted to be carried by said vehicle, a plurality of burner rigs each comprising a skid adapted to slide along the ground, burners carried by said skids, a draft arm extending from each skid to said draft bar, means connected with said draft arms for transmitting lifting movement to said draft arms for raising all of said skids to inoperative positions, pivotal connections between each draft arm and its respective skid permitting said skid to swing vertically relatively to its draft arm, and cooperating stop means carried by each draft arm and its respective skid for limiting the range of swinging movement of the skid relatively to said draft arm when the rigs are raised to their inoperative positions.

18. A flame cultivator attachment adapted to be connected to a vehicle adapted to travel along the plant rows comprising a plurality of burner rigs adapted to be propelled along the plant rows by said vehicle, each of said burner rigs comprising a burner, a fuel tank adapted to be carried by said vehicle, fuel supply connections from said tank to said burners, a compressor adapted to be carried by said vehicle, air supply connections for supplying compressed air from said compressor to said burners, and by-pass means operative to transmit a charge of compressed air from said compressor to said fuel supply connections for blowing out these fuel supply connections when shutting down the operation of the flame cultivator.

19. A flame cultivator attachment adapted to be connected to a wheeled vehicle adapted to travel along plant rows comprising a frame adapted for ready mounting on and dismounting from said wheeled vehicle, a plurality of burners connected with said frame to move along the sides of the plant rows, said burners being directed downwardly at an angle to the line of travel of the vehicle whereby said burners project their flames transversely into and through the plant rows for impinging against the base portions of the plants and against the ground between plants in the row, a fuel tank mounted on said frame for supplying fuel to said burners, and a compressor mounted on said frame for supplying compressed air to said burners, said frame, burners, fuel tank and compressor being all removable as a unit assembly from said wheeled vehicle.

20. A flame cultivator attachment adapted to be connected to a wheeled vehicle adapted to travel along plant rows comprising a frame adapted for ready mounting on and dismounting from said wheeled vehicle, a plurality of burners connected with said frame to move along the sides of the plant rows, said burners being directed downwardly at an angle to the line of travel of the vehicle whereby said burners project their flames transversely into and through the plant rows for impinging against the base portions of the plants and against the ground between plants in the row, a fuel tank mounted on said frame for supplying fuel to said burners, a compressor mounted on said frame for supplying compressed air to said burners, and an electrical ignition system mounted on said frame for igniting said burners, said frame, burners, fuel tank, compressor and ignition system all being removable as a unit assembly from said wheeled vehicle.

21. A flame cultivator attachment unit adapted to be connected to a tractor having a power takeoff comprising, a frame adapted to be connected to said tractor, a plurality of burners of the blast type coupled to said frame, a fuel tank mounted on said frame in gravity feed relationship with said burners, and a compressor mounted on said frame for supplying compressed air to said burners, said compressor having a driving pulley and being so mounted on said frame that said driving pulley is adapted to be connected in driving relationship with said power takeoff by means of a belt.

22. A flame cultivator attachment unit adapted to be connected to a tractor having a power takeoff, comprising a frame adapted to be connected to said tractor, a plurality of burners of the blast type coupled to said frame, a fuel tank mounted on said frame in gravity feed relationship with said burners, fuel conduit means interconnecting said fuel tank and said burners, a compressor mounted on said frame for supplying compressed air to said burners, said compressor having a driving pulley and being so mounted on said frame that said driving pulley is adapted to be connected in direct driving relationship with said power takeoff by means of a belt, air conduit means interconnecting the discharge side of said compressor with said burners, an idler pulley adjustably mounted on said frame so as to be driven by a belt interconnecting said compressor driving pulley and said power takeoff, a distributor mounted on said frame and driven by said idler pulley, spark plugs associated with said burners for igniting the fuel discharged therefrom, and an electrical ignition system connected in circuit relationship with distributor and spark plugs for continuously supplying an intermittent sparking potential to each of said spark plugs in a predetermined order.

PRICE C. McLEMORE.

(References on following page)

REFERENCES CITED

The following references are of record in the file of this patent:

UNITED STATES PATENTS

| Number | Name | Date |
|---|---|---|
| 954,629 | Hebert | Apr. 12, 1910 |
| 1,007,858 | Garner | Nov. 7, 1911 |
| 1,298,880 | Brusch | Apr. 1, 1919 |
| 1,436,958 | Hebert | Nov. 28, 1922 |
| 1,458,070 | Long | June 5, 1923 |
| 1,493,919 | Cunningham | May 13, 1924 |
| 1,835,629 | Bingham | Dec. 8, 1931 |
| 2,212,352 | Plein | Aug. 20, 1940 |
| 2,327,204 | McLemore | Aug. 17, 1943 |
| 2,368,179 | Turpin | Jan. 30, 1945 |
| 2,409,792 | Prewitt | Oct. 22, 1946 |

FOREIGN PATENTS

| Number | Country | Date |
|---|---|---|
| 406,257 | Germany | Nov. 17, 1924 |